Figure 1:
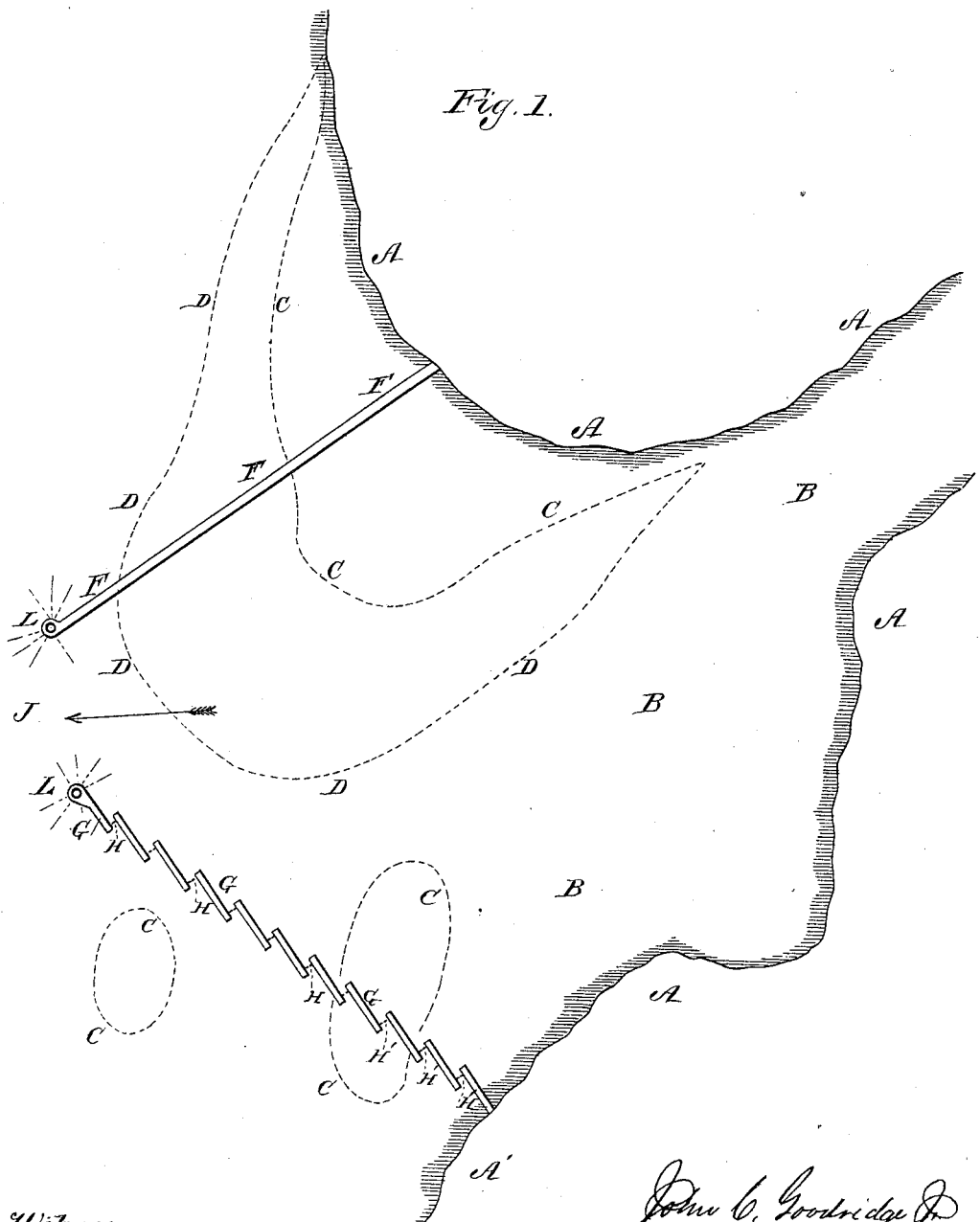

(No Model.)

J. C. GOODRIDGE, Jr.
PROCESS OF DEEPENING AND MAINTAINING CHANNELS FOR NAVIGATION.

No. 320,129. Patented June 16, 1885.

(No Model.) 2 Sheets—Sheet 2.
J. C. GOODRIDGE, Jr.
PROCESS OF DEEPENING AND MAINTAINING CHANNELS FOR NAVIGATION.
No. 320,129. Patented June 16, 1885.
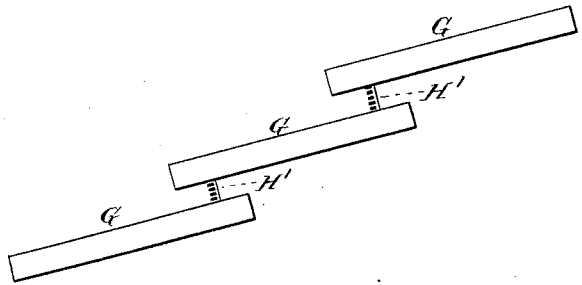

UNITED STATES PATENT OFFICE.

JOHN C. GOODRIDGE, JR., OF NEW YORK, N. Y.

PROCESS OF DEEPENING AND MAINTAINING CHANNELS FOR NAVIGATION.

SPECIFICATION forming part of Letters Patent No. 320,129, dated June 16, 1885.

Application filed March 5, 1885. (No model.)

*To all whom it may concern:*

Be it known that I, JOHN C. GOODRIDGE, Jr., of New York, in the county of New York and State of New York, have invented a new and useful Improvement in Process for the Deepening and Maintenance of Channels for Navigation, of which the following is a specification, reference being had to the accompanying drawings.

My invention relates to the employment of the scour of a natural current to deepen and maintain a channel for navigation. When the bed of a river or the bar of a harbor is of sand or other light material, beneficial result has heretofore followed the use of jetties so arranged as to localize the current and increase the rapidity of its flow, thus scouring out the sand and preventing the deposit of matter suspended in the water and borne down from above. But as far as harbors are concerned this improvement has in all cases been limited to those into which large rivers flow, and in which therefore the discharge on the ebb greatly exceeds the influx on the flood; but this is not the case with tidal harbors, for there the influx and efflux are substantially equal. To surmount this difficulty in these cases is the purpose of my invention. All action toward maintaining a channel must be toward the sea—that is, outward. This I propose to accomplish by making many points of inlet, thus obtaining a diffuse and gentle influx, then by impounding and embaying a large quantity of water, and so directing it on its outward passage that the greater portion of its volume is directed through the space desired as a channel, the conditions existing in those harbors fed by large rivers are practically reproduced, with a like beneficial effect.

In the drawings, Figure 1 represents the plan of a harbor to which my improvement has been applied; and Fig. 2, a series of sectional jetties, the space between the overlapping ends of which is closed by tidal gates.

In Fig. 1, A represents the shore line; B, the roadstead or harbor; C, the ten-foot line of a shoal, and D the twenty-foot line of said shoal. By the natural action of the sea the shoal C D is gradually extended toward the point A' until the roadstead or harbor B is gradually closed up, the shore A working over to A'. I should meet such a contingency by interposing the continuous breakwater F in the path of the motion. Then from a point on the opposite shore A', I extend a series of short breakwaters placed nearly parallel, and at a little distance from one another and at a small angle with the channel, the ends of which overlap, all as shown in Fig. 1. The rising tide then enters all the openings H, the angle with which it impinges on the jetties directing it to and through the intervals. It avails itself of the channel J as well, and thus a comparatively gentle and uniform influx is obtained; but when the tide turns to ebb, the current would encounter the jetties at a different angle, and be in large measure deflected by the openings H, and out through the channel J. Thus the requisite conditions to success—a gentle and general inflow and a comparatively rapid and localized outflow—are obtained.

The flood and ebb tides seldom, if ever, follow the same path. Not only is this so as to the mean or average direction of these currents, but seldom or never does the same current follow the same direction throughout its duration. For example, let us refer to the Atlantic Coast Pilot, 1878—Boston to New York, Appendix No. 1—Rate and direction of current for each tidal hour after time of high water at Boston gave as follows: Northern Channel, E. by N.; S. E.; S. E. ½ S.; S. by E.; S.; W. by N.; N. W. by W.; N. W. by W.; N. N. W.; N. by E. We find from that appendix that in the northern channel the ebb makes an average direction of S. by E., and that the flood makes an average direction of W. N. W., a departure of 60 degrees from a straight line. We also find that the tide moved in every direction except between the points N. by E. and E. by N. a space of 55 degrees, or, in other words, the current moved over an arc of 305 out of 360 degrees. This example is selected at random, and is typical of the universal action of tidal currents. Of course an engineer skilled in the art of harbor improvement would know that every harbor or channel had its local tidal peculiarities, and would make a thorough acquaintance with that feature of the problem the first step.

Then he would so locate his jetties that the incoming flood should be directed to and find easy access at the proper intervals, while the outgoing current would strike the jetties at an angle calculated to deflect it in great part past the openings to find an exit at the main outlet.

That law of nature which compels all moving bodies, fluid as well as solid, to follow the line of least resistance is the root of this matter, for it is clear that if the ebb follows the direction of the arrow in Fig. 1 the current strikes the jetties at such an angle as to glance from them, so to speak; nor can it escape through the openings between the jetties to any important degree, unless it returns upon itself—a thing a current never does, since that is the line of maximum resistance. Nay, further, if the outflowing current is strong, it will suck water through the openings from without, and as far as the current at those special points is concerned an inflowing current will always appear there except at slack-water. The ordinary expirator and inspirator, the spray-atomizers, the Bunsen pump, and many other devices are all illustrations and embodiments of and owe their efficiency to this principle. It may be seen and studied at any time by observing the action of the water at the sides of and below a bridge-pier standing in a rapid current. The downward flow drags away the water from behind the pier, which water always is lower there than the water abreast of it, where the current is unobstructed, and a return-current from below much narrower than the pier will be noticed partially to supply the place of the water so abstracted. The article "Hydronamics," Encyclopedia Britannica, 8th ed., vol. 12, page 138, may be consulted in this connection.

In the preceding description we have assumed the action of the sand and deposit to be following down the coast toward the continuous breakwater F. If the action of the sea drive the sand directly toward the harbor from a point at right angles to it, sectional jetties can be used on both sides of the entrance and the continuous jetty F be omitted.

The most advantageous distance between the detached jetties, their length, and their lap will vary under different circumstances, depending on the flow of the current and the rise and fall of the tide and local topography.

During the formation of the channel, or when the rise and fall of the tide and consequent current is feeble, tidal gates may be used in the intervals H between the sectional jetties G, and so arranged as to open before the incoming and close before the outgoing current, thus directing the entire ebb through the channel. If placed as shown at H', Fig. 2, they will be protected from the violence of the sea.

It is obvious that this method is equally applicable to the improvement of a harbor into which a large river flows, since it tends to increase the disparity already existing between the inward and outward currents.

In the case of a harbor the usefulness of which has become seriously impaired, a beneficial result may be expedited by judicious dredging.

Having thus described my invention, what I claim as new, and desire to patent, is—

1. The within-described means of making, improving, or maintaining a channel for navigation, consisting of sectional overlapping jetties placed at an angle with the outgoing current, and so arranged as to produce a comparatively gentle and diffuse current on the flood-tide and a comparatively rapid current more or less restricted to the channel on the ebb-tide.

2. The within-described means of making, improving, or maintaining a channel for navigation, consisting of sectional overlapping jetties placed at an angle with the outgoing current, the intervals between which are closed with tidal gates, and so arranged as to afford comparatively unrestricted entrance at many points to the inflowing current, but to close against the outgoing current and divert it, wholly or in great part, through the space intended for said channel.

In testimony that I claim the foregoing improvement in process for the deepening and maintenance of channels for navigation, as above described, I have hereunto set my hand this 30th day of December, 1884.

JOHN C. GOODRIDGE, JR.

Witnesses:
M. A. GOODRIDGE,
EMMET PHILIPS.